No. 12,033.

Reissued Sept. 16, 1902.

E. D. SCHMITT.

BOTTLE SEAL.

(Application filed June 14, 1902.)

Witnesses

T. L. Merchant

J. R. Nottingham

Inventor

Edward D. Schmitt by G. W. Thurow,

Attorney

UNITED STATES PATENT OFFICE.

EDWARD D. SCHMITT, OF BALTIMORE, MARYLAND, ASSIGNOR, BY MESNE ASSIGNMENTS, TO THE UNIVERSAL SEAL AND STOPPER COMPANY, OF CAMDEN, NEW JERSEY.

BOTTLE-SEAL.

SPECIFICATION forming part of Reissued Letters Patent No. 12,033, dated September 16, 1902.

Original No. 685,226, dated October 22, 1901. Application for reissue filed June 14, 1902. Serial No. 111,796.

DIVISION B.

*To all whom it may concern:*

Be it known that I, EDWARD D. SCHMITT, a citizen of the United States, residing in the city of Baltimore, in the State of Maryland, have invented new and useful Improvements in Bottle-Seals, of which the following is a specification.

My invention relates to bottle-sealing devices.

The object of the invention is to provide a bottle-seal that can be readily applied to effect a perfect seal and removed from the bottle without the aid of a tool of special construction and one that can be reused to reseal the bottle when desired.

A further object is to provide a simple, cheap, and durable device of this character adapted for use in bottles or jars having certain known structural features.

Figure 1:
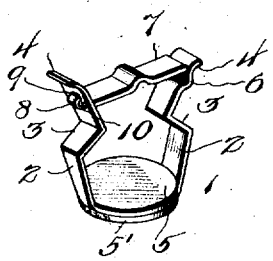
Figure 2:
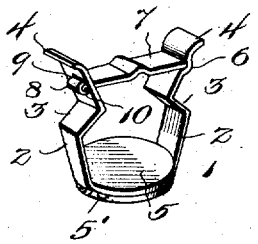
Figure 3:
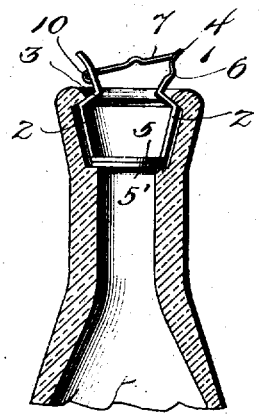
Figure 4:
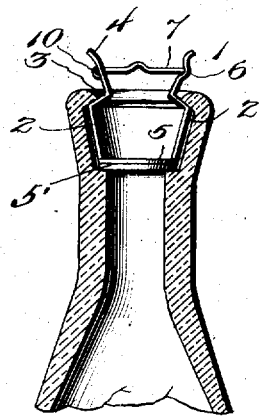

In the drawings, Figure 1 is a perspective view of the device, the locking means thereof being in the position it assumes just before the arms are locked apart. Fig. 2 is a similar view showing the arms locked. Fig. 3 is a view showing the device in the neck of a bottle before locking, and Fig. 4 is a similar view showing the device locked.

One embodiment of my invention is shown and described in Division A of this application, and a similar embodiment is shown in the accompanying drawings, and in both instances I prefer to use a bottle or jar having the shown structural features—that is to say, a bottle or jar having a sealing-seat in its neck and a shoulder or other suitable engaging surface above the sealing-seat.

In the drawings the numeral 1 designates the sealing device, formed of any suitable material, stamped or otherwise shaped to form arms 2, provided with shoulders 3, slightly-curved terminals 4, which extend above the bottle-mouth, as shown, and a base 5, to which is attached a sealing member or disk 5′, of cork or other suitable material, which is adapted to make the necessary sealing contact with the body to which the seal is applied.

One of the arms 2 is provided with a slight depression 6 to receive the free end of a locking device 7, which in the present instance is loosely attached to the opposite arm. The locking device 7 is preferably formed of the same material as the arm and of equal width, with a narrowed portion 8, which extends through the slightly-rectangular opening 9 in one of the arms and is bent upon itself to form a slight enlargement of eye 10, which prevents its withdrawal from the opening, thus hinging or loosely connecting the device with the arm.

I have described and shown the securing member formed with two oppositely-disposed arms, the said arms being slightly inclined upwardly from the base-piece; but it will be understood that any desired number of arms may be used, and they may be of any suitable shape and provided with suitably-shaped shoulders to adapt the arms for engagement with the upper engaging surface in the neck of the receptacle to which the seal is applied.

The device shown is formed of spring metal, and its arms are adapted to be pressed together in applying the seal until the shoulders or engaging surfaces thereon expand against or into engagement with the upper shoulder in the bottle-neck, as shown. At this point the sealing-disk will be in engagement with the sealing-seat, and a pressure to seat the seal will compress the disk. After the device is in the bottle-neck and the sealing-disk sufficiently compressed to make the seal the tongue is forced downward until its end enters the depression in one of the terminals 4, slightly separating arms in this movement, when the device will be locked and a pefect seal produced.

To remove the seal, it is only necessary to pry the tongue or locking device out of the depression in the terminal of the arm, when the arms can be readily pressed toward each other, thus disengaging the shoulders on said arms from the shoulder in the bottle, when the whole device can be readily removed.

In the uses for which this seal is particularly intended it is highly desirable to use a compressible sealing member; but it will be understood that the efficient operation of the device does not necessarily depend upon this, as in some instances a seal may be effected between the base 5 and the body to which it is applied, the efficiency of the seal in that instance depending to a considerable degree either upon the material of which the device is made or the material of the receptacle to which it is applied.

I claim—

1. A bottle-seal comprising a sealing member, a securing member formed with engaging arms, and means for locking said arms.

2. An article of manufacture, a sealing device comprising arms formed with engaging shoulders thereon, a base secured to said arms, and means for locking the arms apart.

3. An article of manufacture, a sealing device comprising arms formed with engaging shoulders thereon, and terminals above the shoulders, a base secured to said arms, and means for locking the terminals and arms apart, substantially as described.

4. A bottle-seal comprising arms formed with engaging shoulders thereon, and terminals above the shoulders, a base secured to said arms and carrying a sealing member, and means for locking the terminals and arms apart, substantially as described.

5. An article of manufacture, a bottle-seal comprising spring-arms each formed with an engaging shoulder and a terminal above the shoulder, a base, a tongue attached to the terminal of one arm and adapted to engage the terminal of the opposite arm for locking purposes, substantially as described.

6. An article of manufacture, a bottle-seal comprising oppositely-disposed spring-arms, each formed with an engaging shoulder, and a terminal above the shoulder, a base, a compressible sealing member secured to the base-piece, a tongue loosely attached to the terminal of one arm and adapted to engage the terminal of the opposite arm for locking purposes, substantially as described.

7. An article of manufacture, a bottle-seal comprising oppositely-disposed spring-arms, each formed with an inclined engaging shoulder, and a terminal above the shoulder, a base, the terminal of one arm being provided with a depression, a compressible sealing member secured to the base-piece, a tongue having one end attached to the terminal of one arm, and having the other end adapted to enter the depression in the opposite terminal to lock the arms apart, substantially as described.

8. An article of manufacture, a bottle-seal comprising arms formed with engaging shoulders thereon, a base secured to said arms and carrying a compressible sealing member, and means for locking the arms apart, substantially as described.

9. A bottle-seal comprising spring-arms formed with engaging shoulders thereon, a base secured to said arms and carrying a compressible sealing member, and means for locking the arms apart, substantially as described.

10. A bottle-seal comprising oppositely-disposed spring-arms formed with engaging shoulders thereon, a base secured to said arms and carrying a compressible sealing member, and means located above the shoulders for locking the arms apart, substantially as de- described.

11. A bottle-seal comprising a sealing member, a securing member formed with engaging arms, and means carried by said arms for locking the securing member.

In testimony whereof I affix my signature in presence of two witnesses.

EDWARD D. SCHMITT.

Witnesses:
MABEL E. STEARNS,
JOHN W. HEWES.